(12) United States Patent
Semaan (10) Patent No.: US 6,991,452 B1
(45) Date of Patent: Jan. 31, 2006

(54) FLAME-YIELDING DEVICE COVER

(76) Inventor: James Semaan, 11321 Richmond M 109, Houston, TX (US) 77082

( * ) Notice: Subject to any disclaimer, the term of this patent is extended or adjusted under 35 U.S.C. 154(b) by 0 days.

(21) Appl. No.: 10/913,939

(22) Filed: Aug. 6, 2004

Related U.S. Application Data (60) Provisional application No. 60/494,455, filed on Aug. 11, 2003.

(51) Int. Cl.
*F23D 3/16* (2006.01)

(52) U.S. Cl. ..................... 431/291; 362/312

(58) Field of Classification Search .............. 431/144, 431/291, 320, 322; 362/312
See application file for complete search history.

(56) References Cited

U.S. PATENT DOCUMENTS

| | | | | |
|---|---|---|---|---|
| 195,725 A | * | 10/1877 | Olmstead | 362/312 |
| 738,449 A | * | 9/1903 | Houghton | 362/312 |
| 1,142,234 A | * | 6/1915 | Bryson | 431/89 |
| D144,781 S | | 5/1946 | Gerson | |
| 2,615,269 A | * | 10/1952 | Hartley | 428/14 |
| D208,421 S | | 8/1967 | Frazier | |
| 3,493,314 A | | 2/1970 | Krance et al. | |
| 3,867,625 A | * | 2/1975 | Whalen | 362/161 |
| 4,805,076 A | * | 2/1989 | Menter | 362/180 |
| D313,479 S | | 1/1991 | Goldberg | |
| D318,927 S | * | 8/1991 | Cleminshaw et al. | D26/11 |
| 5,127,825 A | * | 7/1992 | Tendick, Sr. | 431/320 |
| 5,342,570 A | * | 8/1994 | Ledoux et al. | 264/566 |
| D397,460 S | | 8/1998 | Chambers et al. | |
| D402,502 S | | 12/1998 | Liaw | |
| 5,861,116 A | * | 1/1999 | Mandich | 264/35 |
| D406,365 S | | 3/1999 | Furner | |
| D437,064 S | | 1/2001 | Boss | |
| 6,196,832 B1 | * | 3/2001 | Mifune et al. | 431/129 |
| 6,511,314 B2 | | 1/2003 | Johnson | |
| 6,758,666 B1 | * | 7/2004 | Strunak | 431/291 |

* cited by examiner

*Primary Examiner*—Stephen Gravini
(74) *Attorney, Agent, or Firm*—E. Randall Smith (57) ABSTRACT

An embodiment of an apparatus for holding a flame-yielding device and/or shielding one or more flame yielded thereby includes a sleeve-like body having at least one wall capable of surrounding the flame-yielding device. To hold the flame-yielding device, the at least one wall includes at least one engagement section that is removably slideable over and around the flame-yielding device to grip and hold the flame-yielding device. To shield the flame(s) of the flame-yielding device from extinguishment by air flow during normal operating conditions, the at least one wall includes multiple concave portions extending downwardly from the upper edge thereof.

8 Claims, 5 Drawing Sheets

FLAME-YIELDING DEVICE COVER

This application claims the benefit of U.S. Provisional Patent Application Ser. No. 60/494,455 filed Aug. 11, 2003 and entitled Flame Bearing Item Holder or Cover.

BACKGROUND OF THE INVENTION

The present invention relates to apparatus and methods relating to covers for fuel cells, liquid fuel lamps, candles, torches or other items that yield or have one or more flame. As used herein, the term "flame-yielding device" means any item that may carry or yield one or more flame, including without limitation fuel cells, liquid fuel lamps, candles, torches and other wicked items.

Flame-yielding devices are useful for various purposes, such as providing light, heat, aroma, insect repellant, etc. Flame-yielding devices are also used for aesthetic and decorative purposes. In various scenarios, flame-yielding devices are often used in conjunction with some sort of cover, or holder, that generally surrounds the sides of all or part of the flame. As used herein, the term "cover" means one or more device that generally surrounds the sides of all or part of the flame(s) of one or more flame-yielding device.

Flame-yielding devices with covers are very popular for use, for example, in restaurants, hotels, bars and nightclubs. In many instances, each customer table has a flame-yielding device. Some of the important concerns that often arise involving the use of flame-yielding devices and their covers include cost, ease of handling and maintenance and the ability of the flame-yielding devices to remain lit during normal operating conditions. Other concerns include safety in handling and use, and minimizing the space occupied by the flame-yielding devices and their covers. These and/or other concerns can impact business profits, employee training and efficiency and customer satisfaction.

It should be noted that the above-described concerns are only examples and may vary depending upon the situation. Moreover, there may be other or different concerns. Merely by mentioning the above concerns, it is not intended that each claim of this patent be limited to address or exclude each such concern. Accordingly, none of the appended claims should be limited in any way by the above discussion, or construed to address or exclude the cited concerns, except and only to the extent as may be expressly stated in a particular claim.

While there are many different types of covers presently available, there remains a need for improved flame-yielding device covers and methods of manufacturing the same having one or more of the following attributes, capabilities or features: eliminates the need for a separate flame-yielding device base member; is easily separable from the corresponding flame-yielding device; can be separated from the flame-yielding device without applying pressure to, banging or pushing on the flame-yielding device; is easy to use, clean, handle and maintain; is portable and easily movable between locations; is wind-resistant; may be used outdoors; reduces the accumulation of carbon build-up on the cover; is space and size efficient; occupies minimal space; may be made in different shapes and sizes; is uniquely decorative; is capable of displaying the flame-yielding device at different heights; is constructed of material that is resilient, strong, durable, non-flammable, or any combination thereof; is easy and cost effective to manufacture; or any combination thereof.

BRIEF SUMMARY OF THE INVENTION

Some embodiments of the present invention involve an apparatus for holding a flame-yielding device that includes a generally upwardly extending, sleeve-like body having at least one wall capable of surrounding the flame-yielding device and any flame(s) yielded thereby. The wall includes at least one engagement section extending at least partially around at least part of the height of the wall. The engagement section is removably slideable over and around the flame-yielding device so that the engagement section grips and holds the flame-yielding device when the engagement section is slid over the flame-yielding device. The wall also includes an upper edge and at least two concave portions extending downwardly along at least part of the wall from the upper edge so that the wall shields the flame yielded by the flame-yielding device from extinguishment by air flow under normal operating conditions.

In various embodiment of the present invention, the at least one engagement section has a generally oval shape. A first pair of opposing sides of the engagement section is capable of engaging and gripping opposite sides of the flame-yielding device when the engagement section is slid over and around the flame-yielding device. The flame-yielding device is firmly held within the body when the first pair of opposing sides is engaged with the flame-yielding device. A second pair of opposing sides of the engagement section is disposed between the first pair of opposing sides and is non-engageable with the flame-yielding device when the engagement section is slid over and around the flame-yielding device. When the flame-yielding device is engaged by the first pair of opposing sides of the engagement section, the application of sufficient force to each of the second pair of opposing sides will cause the first pair of opposing sides to disengage the flame-yielding device and release the flame-yielding device from the body.

The present invention includes embodiments of an apparatus for holding a liquid fuel cell, the liquid fuel cell having an outer generally circumferential surface and capable of yielding at least one flame. The apparatus includes a generally upwardly extending, sleeve-like body constructed at least partially of a thermoplastic material and having at least one wall capable of surrounding the liquid fuel cell and the flame yielded thereby. The wall includes at least one engagement section having a generally circular or square shape and is removably slideable over and around the outer generally circumferential surface of the liquid fuel cell. When the engagement section is slid over the liquid fuel cell, the engagement section grips and holds the liquid fuel cell so that the body and the liquid fuel cell may be lifted and moved without separation of the liquid fuel cell from the body.

Various embodiments of the invention involve an apparatus for shielding at least one flame yielded by a flame-yielding device from extinguishment by air flow under normal operating conditions. The apparatus includes a generally upwardly extending, sleeve-like body having at least one wall capable of surrounding the flame-yielding device and flame yielded thereby. The wall also includes an upper edge and four concave portions extending downwardly along at least part of the wall from the upper edge so that the wall shields the flame yielded by the flame-yielding device from extinguishment by air flow under normal operating conditions.

In accordance with the invention, an embodiment of methods for forming an apparatus for holding a flame-yielding device includes heating a tubular member, and while the tubular member is hot, partially pinching together a first pair of opposing sides of the tubular member proximate to the top of the tubular member to form a first pair of concave portions on the tubular member. Also while the tubular member is hot, a second pair of opposing sides of the tubular member is partially pinched together proximate to the top of the tubular member to form a second pair of concave portions on the tubular member. Also, inwardly directed forces are applied to a first pair of opposing sides of the tubular member proximate to the bottom of the tubular member to form an oval shape proximate to the bottom of the tubular member.

An embodiment of a method for forming an apparatus for holding a flame-yielding device having a generally circular outer wall includes heating a tubular member and sliding the flame-yielding device through the tubular member to give the tubular member a generally circular cross-sectional shape. Also while the tubular member is hot, a first pair of opposing sides of the tubular member are partially pinched together proximate to the top of the tubular member to form a first pair of concave portions on the tubular member, and a second pair of opposing sides of the tubular member are partially pinched together proximate to the top of the tubular member to form a second pair of concave portions on the tubular member.

Accordingly, the present invention includes features and advantages which are believed to enable it to advance the technology of flame-yielding device covers. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

For a detailed description of preferred embodiments of the invention, reference will now be made to the accompanying drawings wherein.

DETAILED DESCRIPTION OF PREFERRED EMBODIMENTS OF THE INVENTION

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents, and alternatives falling within the spirit and scope of the invention as defined by the appended claims. In showing and describing the preferred embodiments, common or similar features are indicated by like or identical reference numerals or, in the absence of a reference numeral, are evident based upon the appended drawings and/or description herein. The figures are not necessarily to scale and certain features and certain views of the figures may be shown exaggerated in scale or in schematic in the interest of clarity and conciseness.

The terms "present invention", "invention" and variations thereof, as used throughout this patent and in the headings herein, mean one or more embodiment of the invention. These terms are not intended and should not be construed to mean or refer to the "claimed invention" of all, or any particular, claim or claims of this or any other patent or patent application. Thus, the subject matter referred to in the context of the terms "present invention", "invention" and variations thereof herein is not intended to and should not limit, or be required for, any of the claims merely because of such reference. For example, the BRIEF SUMMARY OF THE INVENTION and DETAILED DESCRIPTION OF PREFERRED EMBODIMENTS sections of this patent discuss non-limiting examples, or embodiments, of the invention. Such discussions and the details thereof are not intended and should not be construed to be required by any claim unless and only to the extent expressly required in the claim itself.

Figure 1:
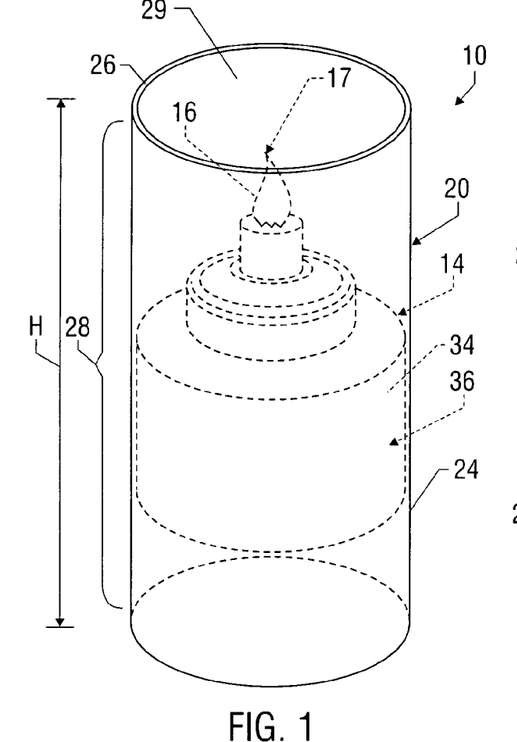
FIG. 1 is a perspective view of an embodiment of an apparatus for holding a flame-yielding device in accordance with the present invention.

Referring initially to FIG. 1, an embodiment of an apparatus 10 for holding a flame-yielding device 14 is shown. The holding apparatus 10 includes an elongated, generally upwardly extending, sleeve-like body 20 having at least one wall 24 capable of surrounding the flame-yielding device 14 and any flame 16 that may be yielded thereby. The wall 24 includes at least one engagement section 28 extending at least partially around at least part of the wall 24 and which is removably slideable over and around the flame-yielding device 14. When the engagement section 28 is slid over the flame-yielding device 14, the engagement section 28 grips and holds the flame-yielding device 14, eliminating the necessity of a separate base member (e.g. base 58, FIG. 17) used to hold or carry the flame-yielding device 14. It should be understood, however, that a base member or other component may still be used. If desired, the engagement of the flame-yielding device 14 in the holding apparatus 10 may be sufficiently firm to allow lifting and moving of the device 14 within the apparatus 10 without the device 14 falling out of, or separating from, the apparatus 10. However, this capability is not necessarily required in all embodiments.

Figure 2:
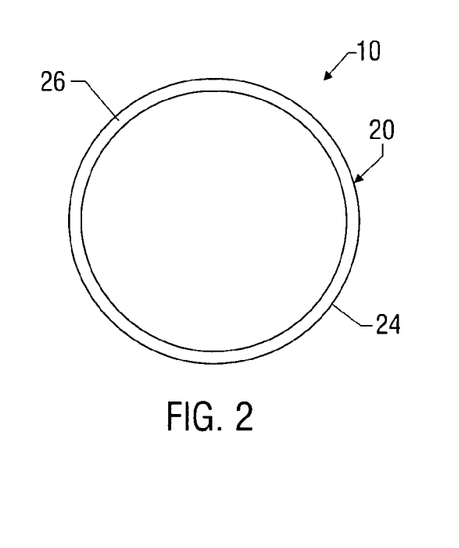
FIG. 2 is a top view of the embodiment of FIG. 1 without showing the example flame-yielding device.

The engagement section(s) 28 may have any suitable shape and size so long as it is capable of gripping and holding the flame-yielding device 14. As shown in FIG. 2, the engagement section 28 of the embodiment of FIG. 1 has a generally circular shape and is sized to engage, grip and hold a generally circumferential outer surface 34 of an outer wall 36 of the flame-yielding device 14. In the example shown, the flame-yielding device 14 is a fuel cell, but may be any suitable device. Thus, the present invention is not limited by the type and shape of the flame-yielding device 14 so long as it can be gripped and held by the one or more engagement section 28.

Still referring to the embodiment of FIG. 1, the illustrated engagement section 28 extends along the entire height H of the body 20. The flame-yielding device 14, in this example, may thus be gripped and held at multiple positions along the height H of the body 20. If desired, a tube-like member or instrument (not shown) having an outer diameter smaller than the inner diameter of the body 20 may be used to move the flame-yielding device 14 within or out of the body 20. Also if desired, numerous bodies 20 with corresponding flame-yielding devices 14 disposed at any variety of staggered, differing or similar positions therein may be displayed together for an attractive multi-piece arrangement (not shown).

Still referring to FIG. 1, the holding apparatus 10 of this embodiment occupies the minimal amount of space around the sides of the flame-yielding device 14. Further, if desired, the height of the holding apparatus 10 may be may be minimized (not shown) by sizing the height H of the body 20 so that the top edge 26 of the wall(s) 24 is at or near the approximate top of the flame 16.

Figure 3:
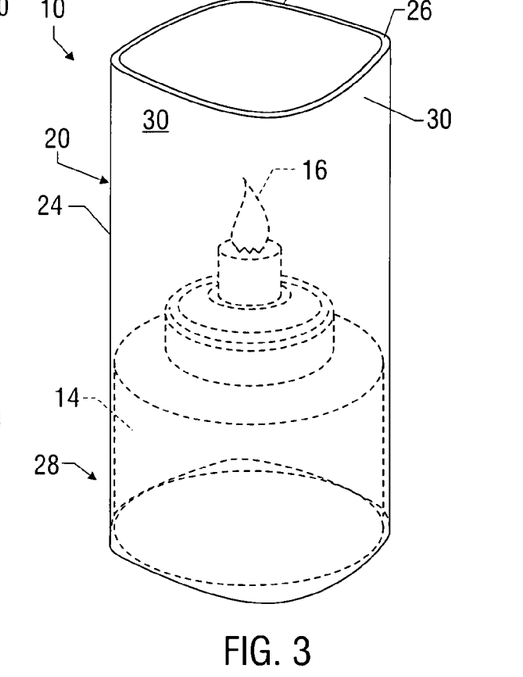
FIG. 3 is a perspective view of another embodiment of an apparatus for holding a flame-yielding device in accordance with the present invention.
Figure 4:
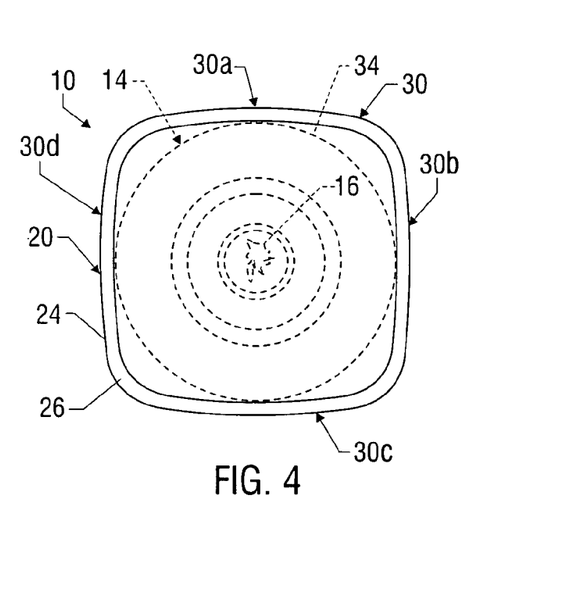
FIG. 4 is a top view of the embodiment of FIG. 3.

In other embodiments, such as the example of FIGS. 3 and 4, the engagement section(s) 28 may have three or more sides 30 capable of gripping and holding the flame-yielding device 14. In the embodiment shown, the engagement section 28 has four sides 30a–d formed in a generally square-like shape and extends across the entire height of the body 20.

Figures 5, 7:
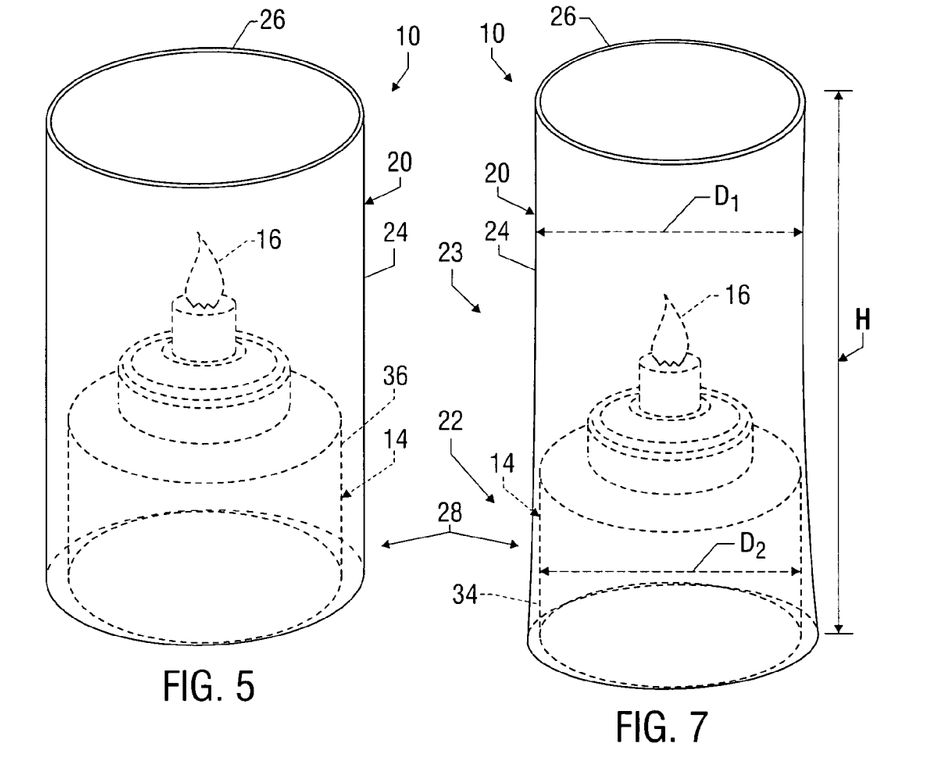
FIG. 5 is a perspective view of yet another embodiment of an apparatus for holding a flame-yielding device in accordance with the present invention.
FIG. 7 is a perspective view of yet another embodiment of an apparatus for holding a flame-yielding device in accordance with the present invention.
Figure 6:
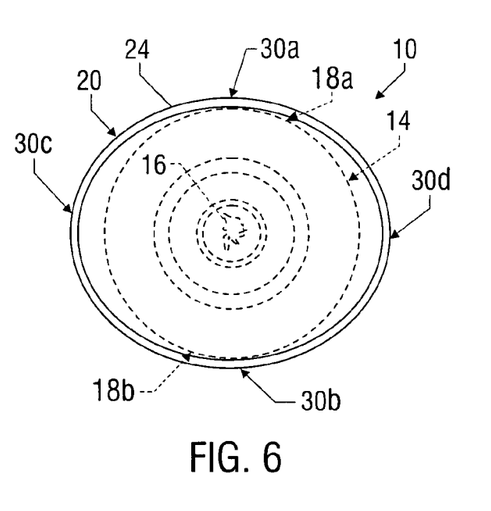
FIG. 6 is a top view of the embodiment of FIG. 5.

In yet other embodiments, such as the example of FIGS. 5 and 6, the at least one engagement section 28 has a generally oval shape. As used herein, the term "oval" means a shape formed where the distance or diameter between one set of opposing sides of an engagement section 28 differs from the distance or diameter between another set of opposing sides thereof, such as a generally oval or elliptical shape. In this example, the engagement section 28 includes a first pair of opposing sides 30a, 30b between which opposite sides 18a, 18b of the flame-yielding device 14 may be gripped and held when the engagement section 28 is slid over and around the flame-yielding device 14.

Still referring to FIGS. 5 and 6, the body 20 may be designed so that a second pair of opposing sides 30c, 30d of the engagement section 28 can be used to release the flame-yielding device 14 from the body 20. These sides 30c, 30d are located between the first pair of opposing sides 30a, 30b. When the engagement section 28 is slid over and around the flame-yielding device 14, the sides 30c, 30d are non-engageable, and in a spaced relationship, with the flame-yielding device 14. The application of inwardly directed forces or a squeezing-type action upon the sides 30c, 30d will cause the first pair of sides 30a, 30b to flex or bend away from one another. The sides 30a, 30b will disengage from the flame-yielding device 14, allowing it to slide freely out of the engagement section 28 and, in this example, the entire body 20.

Figure 8:
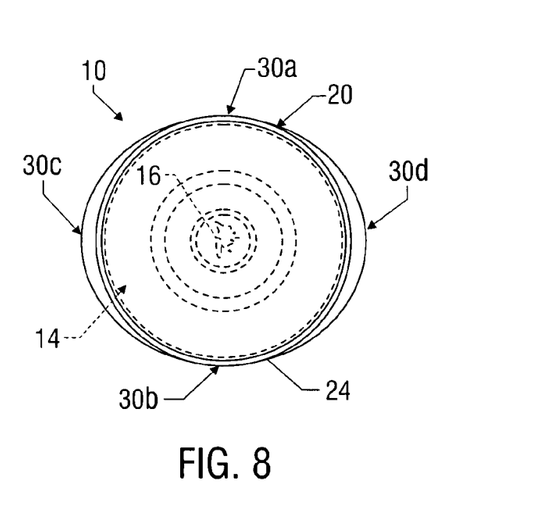
FIG. 8 is a top view of the embodiment of FIG. 7.

In another independent aspect of the present invention, the engagement section(s) 28 may be located along only a portion of the height H of the body 20. In the embodiment of FIGS. 7 and 8, for example, the oval-shaped engagement section 28 is located at the lower portion 22 of the body 20. In other instances, it may be desirable to locate the engagement section 28 at another portion of the body 20.

Still referring to FIGS. 7 and 8, in this particular embodiment, the remainder of the body 20 above the engagement section 28 has a circular shape with an inner diameter D1 that is larger than the outer diameter D2 of the flame-yielding device 14. The flame-yielding device 14 is thus freely slideable within the upper portion 23 of the body 20. In yet other embodiments, multiple engagement sections 28 may be disposed at multiple locations (not shown) along the height H of the body 20.

Figure 9:
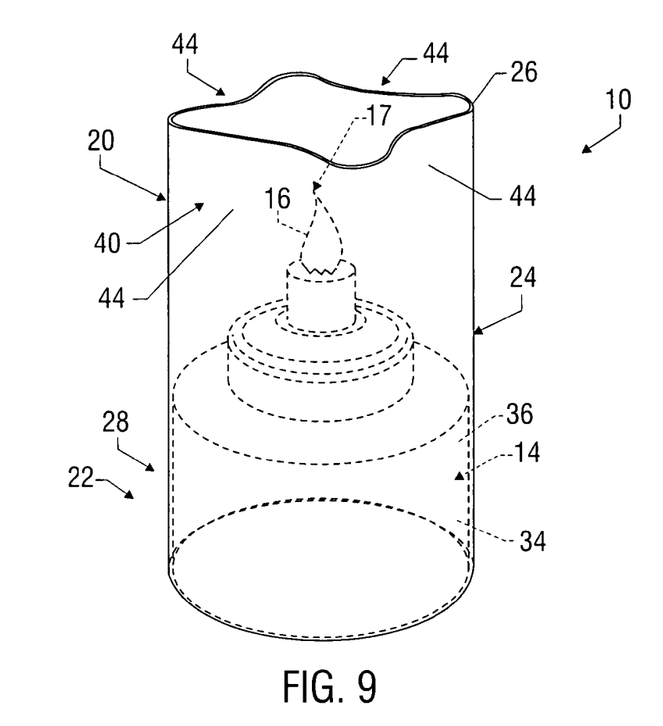
FIG. 9 is a perspective view of an embodiment of an apparatus for holding a flame-yielding device that includes an embodiment of a flame shield in accordance with the present invention.

Now referring to FIG. 9, the holding apparatus 10 may, if desired, include a flame shield 40 to assist in preventing the flame(s) 16 yielded by the flame-yielding device 14 from extinguishment by ambient air flow during normal or typical operating conditions. In some instances, depending upon the particular design, the flame shield 40 may render the flame-yielding device 14 wind-resistant even in a typical outdoor environment.

Figure 10:
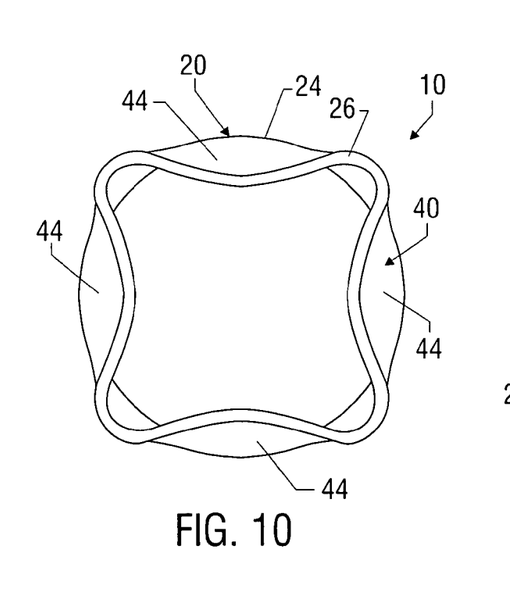
FIG. 10 is a top view of the embodiment of FIG. 9 without showing the example flame-yielding device.

In accordance with the present invention, the flame shield 40 of this embodiment includes four concave portions 44 extending from the top edge 26 of the wall 24 of the body 20 downwardly along part of the wall 24. In the example shown, the concave portions 44 extend along approximately the top one-third of the wall 24, and the top edge 26 (FIG. 10) of the wall 24 has a wavy or multi-curved path. However, any number of two or more concave portions 44 extending along any desired length of the wall(s) 24 and forming any desired path along the top edge 26 of the wall 24, or having any other suitable form and arrangement capable of assisting in preventing extinguishment of the flame(s) 16, may be used.

Figure 11:
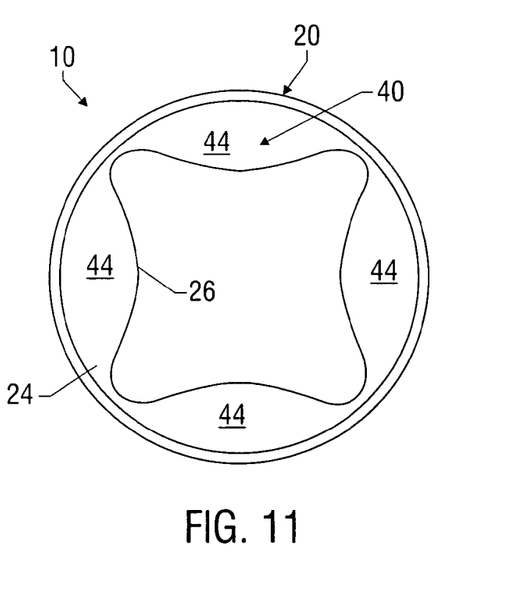
FIG. 11 is a bottom view of the embodiment of FIG. 9 without showing the example flame-yielding device.

Still referring to FIG. 9, the body 20 of this embodiment includes a circular shaped engagement section 28 (similar in operation to the engagement section 28 described with respect to FIGS. 1, 2) located at the lower portion 22 (See FIG. 11) of the body 20. However, any configuration and arrangement of the engagement section(s) 28 may be included.

Figure 12:
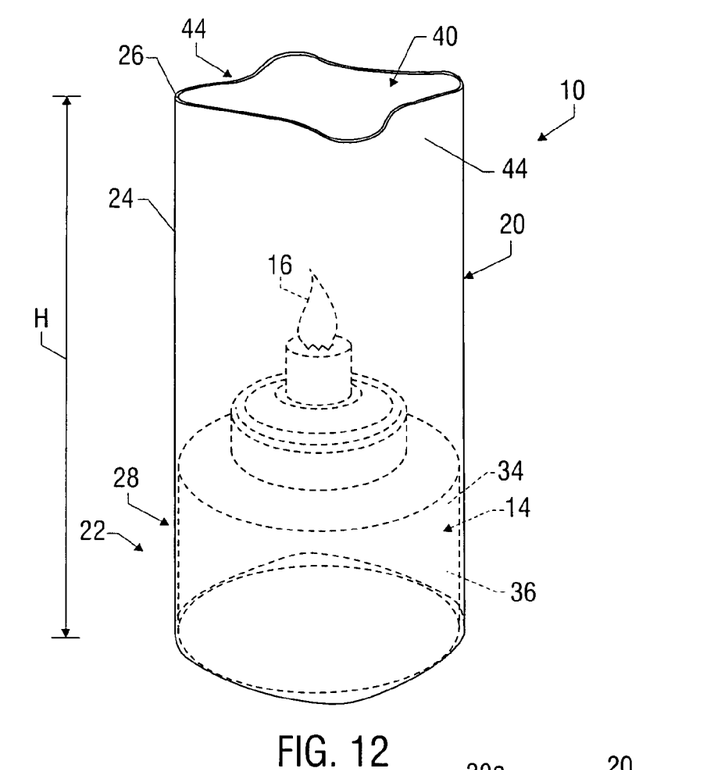
FIG. 12 is a perspective view of another embodiment of an apparatus for holding a flame-yielding device that includes an embodiment of a flame shield in accordance with the present invention.
Figure 13:
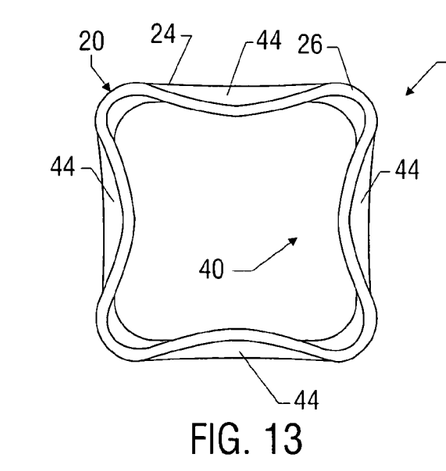
FIG. 13 is a top view of the embodiment of FIG. 12 without showing the example flame-yielding device.
Figure 14:
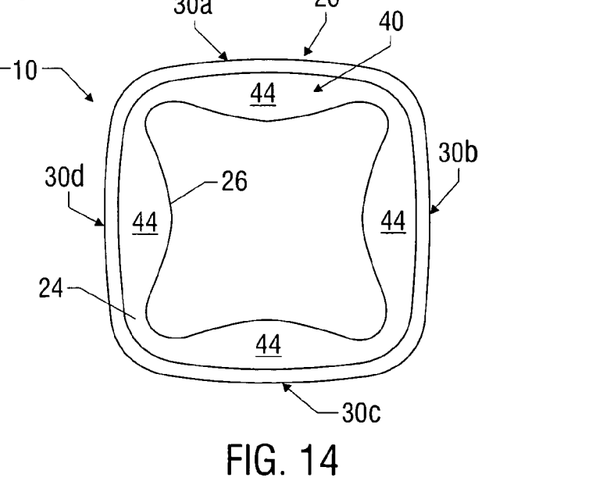
FIG. 14 is a bottom view of the embodiment of FIG. 12 without showing the example flame-yielding device.

FIGS. 12–14 illustrate an embodiment of a holding apparatus 10 having a flame shield 40 similar to that described above with respect to FIG. 9, except the concave portions 44 extend approximately to the middle of the height H of the body 20. In this example, the engagement section 28, which is generally similar to that described above with respect to FIG. 3, extends generally along the bottom half of the height H of the body 20.

Figures 15, 16, 17:
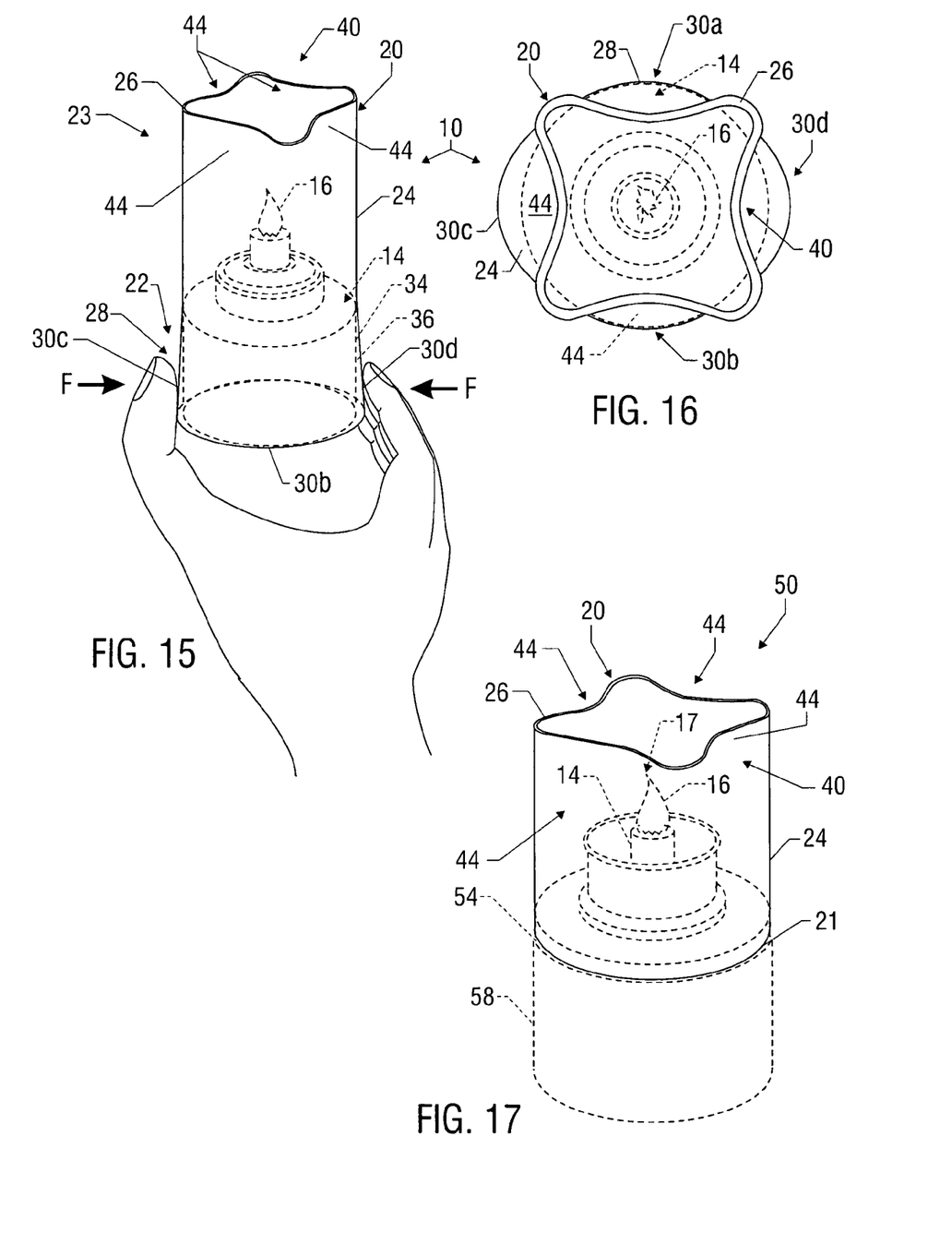
FIG. 15 is a perspective view of another embodiment of an apparatus for holding a flame-yielding device that includes an embodiment of a flame shield and showing the manual application of pressure to the exemplary engagement section to release the flame-yielding device therefrom in accordance with the present invention.
FIG. 16 is a top view of the embodiment of FIG. 15.
FIG. 17 is a perspective view of an embodiment of an apparatus for surrounding a flame-yielding device that includes an embodiment of a flame shield and is shown engaged with an example flame-yielding device base.

In FIG. 15, an embodiment of a holding apparatus 10 is shown including a flame shield 40 similar to the flame shield 40 described above with respect to FIG. 9. In this example, the apparatus 10 includes an engagement section 28 similar to that described above with respect to FIGS. 7 and 8. FIG. 15 illustrates the application of forces F to the opposing sides 30c, 30d of the engagement section 28 by manual squeezing. Upon such application of forces, the flame-yielding device 14 will release from the opposing sides 30a, 30b of the engagement section 28 and slip out of the lower portion 22 of the body 20.

Referring now to FIG. 17, it may be desirable to include a flame shield 40 on an apparatus 50 for surrounding a flame-yielding device 14. The surrounding apparatus 50 includes a generally upwardly extending sleeve-like body 20 having at least one wall 24 capable of surrounding the flame-yielding device 14 and any flame 16 that may be yielded thereby, generally similarly as described above with respect to the holding apparatus 10 of FIG. 1. However, the body 20 of the surrounding apparatus 50 does not hold or carry the flame-yielding device 14, or include an engagement section 28 that slides over and grips the device 14. Instead, the body 20 connects with or otherwise engages the flame-yielding device 14 or other component. In the example shown, the lower edge 21 of the body 20 rests upon a ledge or lip 54 of a base 58 that carries the flame-yielding device 14. However, the body 20 and flame-yielding device 14 may be associated in any other desired manner.

In another independent aspect of the present invention, the holding apparatus 10 and/or surrounding apparatus 50 (e.g. FIGS. 1, 9, 17) may be designed so that the top edge 26 of each wall 24 is located at any desired height relative to the flame(s) 16 of the flame-yielding device 14. For example, the top edge 26 may be located high above, slightly above or generally even with the top 17 of the flame 16. For another example, referring to FIG. 17, if the holding apparatus 10 or surrounding apparatus 50 includes a flame shield 40, the shield 40 may still provide wind resistance for the flame 16 and may reduce carbon build-up near the top of the apparatus 10, 50 even when the top edge 26 of the wall 24 is adjacent, or proximate, to the top 17 of the flame 16. However, the height of the apparatus 10, 50 may be based upon any desired reason.

In yet other independent aspects of the invention, the body 20 may have any suitable size, shape, configuration and construction. For example, the body 20 may be unitary or multi-part, and may, if desired, be engaged with one or more components intermediate to the flame-yielding device 14. Further, the body 20 may be constructed of any suitable, desirable material or combination of materials, such as, without limitation, glass or plastic. If desired, the material(s) used for the body 20 may possess good safety and/or durability qualities, such as by being non-flammable and difficult to damage during normal use and handling. For another example, it may be desirable to utilize material for at least part of the body 20 that is moldable into a desired shape and thereafter temporarily flexes under certain forces. For still a further example, the body 20 may be constructed of material that can be given a desired color, color combination or ornamental design. One example material having at least some of the above qualities is thermoplastic material, such as acrylic.

In a further independent aspect of the present invention, the inner surface 29 (e.g. FIG. 1) of the engagement section 28 may be treated. For example, the inner surface 29 may be polished to a smooth finish or otherwise made smooth, such as to assist in gripping and holding the flame-yielding device 14, enabling the easy release thereof or any other desired reason.

In still another independent aspect of the present invention, the holding apparatus 10 or surrounding apparatus 50 may be manufactured and assembled in any suitable manner. In one embodiment of a method for assembling the holding apparatus 10 of FIG. 15, a tubular member constructed of a material that is pliable under heat is used to form the body 20. For example, the upper portion 23 of the body 20 may be heated and pinched to form the concave portions 44 of the flame shield 40, and the lower portion 22 may be heated and pinched into the desired oval (or other) shape to form the engagement section 28.

In other embodiments, the body 20 may be shaped by moving an object inside a heated tube. For example, to create the holding apparatus 10 of FIG. 1, a six inch long acrylic tube may be formed into a circular body 20 by running the flame-yielding device 14 through the tube. After cooling, the inner surface 29 of the engagement section 28 may be polished to a smooth finish, if desired.

In yet other embodiments, the body 20 may be shaped by engaging a heated tube with or within one or more mold, form, press or template (not shown). For example, to create the holding apparatus 10 of FIG. 3, a tube (not shown) having a circular cross-sectional shape may be formed into the body 20 having a generally square shape by heating the tube and engaging it between a pair of angled, or corner-shaped molds (not shown). In still other embodiments the body 20 may be formed by injection molding or other suitable fabrication or manufacturing technique. Accordingly, the desired shape of the body 20, engagement section(s) 28 and flame shield 40 may be formed by any suitable method or technique.

It should be understood that the present invention does not require each of the techniques or acts described above and is not limited to the above-described methods. Further, the methods described above and any other methods which may fall within the scope of any of the appended claims can be performed in any desired suitable order, and are thus not necessarily limited to the order described herein or listed in any of the appended claims. Yet further, the methods of the present invention do not require the particular embodiments of the holding apparatus 10 and surrounding apparatus 50 as shown and described in the present specification, but are equally applicable with any other suitable structure, form and configuration of components.

Preferred embodiments of the present invention thus offer advantages over the prior art and are well adapted to carry out one or more of the objects of the invention. It should be understood that all of the above components and any other components that may be included may have any suitable, desired size, material construction, configuration, form and quantity, as is or becomes known. The present invention is in no way limited to the components, configurations, dimensions, specific examples or other details described above or shown in the attached figures. Further, the above-described features are not limited to the details as described and shown. Yet further, each such feature can be used independent of any other feature. Moreover, the present invention does not require each of the above features and includes further capabilities, functions, methods, uses and applications, as will be apparent to a person skilled in the art based upon the description above and the appended drawings and claims.

While preferred embodiments of this invention have been shown and described, many variations, modifications and/or changes, such as in the components, details of construction and operation, arrangement of parts and/or methods of manufacture or assembly, are possible, contemplated by the patentee, within the scope of the appended claims, and may be made and used by one of ordinary skill in the art without departing from the spirit or teachings of the invention and scope of the appended claims. Thus, all matter herein set forth or shown in the accompanying drawings should be interpreted as illustrative and not limiting. Accordingly, the scope of the invention and the appended claims is not limited to the embodiments described and shown herein.

What is claimed is:

1. An apparatus for holding a liquid fuel cell without requiring a base portion or member that holds or supports the liquid fuel cell from below, the liquid fuel cell having an outer generally circumferential surface and capable of yielding at least one flame, the apparatus comprising:

a generally upwardly extending, sleeve-like body being constructed at least partially of thermoplastic material and having at least one wall capable of surrounding the liquid fuel cell and the flame yielded thereby, said wall including at least one engagement section having a generally circular shape and being removably slideable over and around the outer generally circumferential surface of the liquid fuel cell, whereby when said engagement section is slid over the liquid fuel cell, said engagement section grips and holds the liquid fuel cell so that said body and the liquid fuel cell may be lifted and moved without separation of the liquid fuel cell from said body.

2. The apparatus of claim 1 wherein at least part of the inner surface of said engagement section has a smooth finish.

3. The apparatus of claim 2 wherein said engagement section is disposed along multiple portions of the height of said body, whereby the liquid fuel cell may be gripped and held within said body at multiple positions along the height of said body.

4. The apparatus of claim 1 wherein said wall includes an upper edge and at least two concave portions extending downwardly along at least part of said wall from said upper edge, whereby said wall shields the flame yielded by the liquid fuel cell from extinguishment by air flow under normal operating conditions in indoor and outdoor environments.

5. The apparatus of claim 4 further including a plurality of said bodies, each said body carrying a liquid fuel cell at a differing location along the height thereof, respectively.

6. An apparatus for holding a liquid fuel cell, the liquid fuel cell having an outer generally circumferential surface capable of yielding at least one flame, the apparatus comprising:

a generally upwardly extending, sleeve-like body being constructed at least partially of thermoplastic material including acrylic and having at least one wall surrounding the liquid fuel cell and the flame yielded thereby when the liquid fuel cell is held by the apparatus, said wall including at least one engagement section having a generally square shape and being removably slideable over and around the outer generally circumferential surface of the liquid fuel cell, whereby when said engagement section is slid over the liquid fuel cell, said engagement section grips and holds the liquid fuel cell so that said body and the liquid fuel cell may be lifted and moved without separation of the liquid fuel cell from said body.

7. The apparatus of claim 6 wherein said body is constructed at least partially of glass.

8. The apparatus of claim 6 wherein said wall includes an upper edge and at least two concave portions extending downwardly along at least part of said wall from said upper edge, whereby said wall shields the flame yielded by the liquid fuel cell from extinguishment by air flow under normal operating conditions in indoor and outdoor environments.

* * * * *